(12) United States Patent
Smeraldi

(10) Patent No.: US 6,745,954 B1
(45) Date of Patent: Jun. 8, 2004

(54) TRAILER-MOUNTED ATOMIZER

(75) Inventor: Paolo Smeraldi, Montescano-Pavia (IT)

(73) Assignee: C.I.M.A. S.p.A., Pavia (IT)

( * ) Notice: Subject to any disclaimer, the term of this patent is extended or adjusted under 35 U.S.C. 154(b) by 80 days.

(21) Appl. No.: 09/980,336

(22) PCT Filed: May 31, 2000

(86) PCT No.: PCT/IB00/00740

§ 371 (c)(1),
(2), (4) Date: Dec. 3, 2001

(87) PCT Pub. No.: WO00/74482

PCT Pub. Date: Dec. 14, 2000

(30) Foreign Application Priority Data

Jun. 2, 1999 (IT) .......................................... MI99A1240

(51) Int. Cl.⁷ .............................................. A01G 25/09
(52) U.S. Cl. ......................... 239/172; 239/77; 280/412; 280/789
(58) Field of Search ................... 239/77, 172; 280/412, 280/789

(56) References Cited

U.S. PATENT DOCUMENTS

| 3,125,294 A | * | 3/1964 | Lill .............................. 239/172 |
| 3,319,890 A | * | 5/1967 | Wolford ....................... 237/77 |
| 5,335,856 A | * | 8/1994 | Nathan ......................... 239/172 |
| 6,082,631 A | * | 7/2000 | Aslakson ..................... 239/172 |
| 6,206,406 B1 | * | 3/2001 | May et al. .................... 239/77 |

FOREIGN PATENT DOCUMENTS

| DE | 1 086 482 | 8/1960 |
| EP | 0 530 479 | 3/1993 |
| NL | 6 701 582 | 8/1968 |
| SU | 180 013 | 4/1966 |

* cited by examiner

*Primary Examiner*—Steven J. Ganey
(74) *Attorney, Agent, or Firm*—Young & Thompson

(57) ABSTRACT

In a trailer-mounted atomizer, preset to be towed with a tractor (2) and including a spreading apparatus (1) fed from a tank (3) and a trailer (4) with a towing drawbar (5), the tank (3) is fixed directly onto the trailer (4), and the towing drawbar (5) of the trailer (4) is articulated to the tractor (2) by way of the spreading apparatus (1), this latter being removably fixed to the tractor (2).

19 Claims, 5 Drawing Sheets

TRAILER-MOUNTED ATOMIZER

The present invention concerns an atomizer, particularly a trailer-mounted atomizer.

There are known to be at present, available on the market and widely used, trailer-mounted atomizers which comprise a spreading apparatus fed from a tank, containing the treating substances to be spread, and a trailer carrying both the apparatus and the tank, said trailer being towed by vehicles, as for example tractors.

Nevertheless, this type of arrangement has always involved problems as far as use and maintenance, since it fairly often happens that the towing means are not suited to allow the trailer to follow the wanted trajectories, while the means transmitting the motion from the tractor to the atomizer are subject to undesired and even dangerous stresses, due to the paths having to be followed and to the unevenness of the ground. In fact, in many types of cultivations, particularly orchards or vineyards, a tractor towing a trailer-mounted atomizer has often great difficulties in following the set mixed courses, often forming very sharp curves, which the arrangement of the plants require to follow in order to spread the treating substance in a complete, efficient and uniform manner. It is besides evident that, during the spreading treatment, the tractor has to work on grounds which are often rough and uneven. The spreading of the treating substances thereby risks not to be always effective, while the undesired stresses on the connecting joint between the towing drawbar of the trailer and the tractor, and on the cardan shaft transmitting the motion from the tractor to the atomizer, compel the user to carry out tiresome, sometimes frequent and often costly, maintenance operations.

The main object of the present invention is to supply a trailer-mounted atomizer, the towing of which is obtained in a manner such as to allow performing more easily the manoeuvres on the bends of the courses followed by the tractor, and transmitting the motion from the tractor to the atomizer without changing the position of the cardan shaft, also along bends, on humps, and so on.

Another object of the present invention is to supply a trailer-mounted atomizer, the towing of which is obtained in a manner such as to reduce to a minimum the stresses produced thereon by the unevenness of the ground on which it operates.

According to a first essential aspect of the present invention, in a trailer-mounted atomizer preset to be towed with a tractor and comprising a spreading apparatus fed from a tank and a trailer with a towing drawbar, said tank is fixed directly onto the trailer and the towing drawbar of the trailer is articulated to the tractor by way of the spreading apparatus, this latter being removably fixed to the tractor. Suitably, the motion is transmitted from the tractor to the atomizer by means of a cardan shaft interposed between the tractor and the spreading apparatus and always keeping in a substantially horizontal position.

According to a further aspect of the present invention, the towing drawbar of the trailer is connected to the base of the spreading apparatus by means of an articulated joint with vertical axis, and the spreading apparatus is removably fixed to the tractor by being suspended to the draw-hook of said tractor, onto which it is also held by jack means.

In a preferred embodiment of the atomizer according to the present invention, adjustable connection means are provided between the spreading apparatus and the tractor and, respectively, between the trailer and the spreading apparatus, to make the distance between the axis of said articulated joint and the axis of the rear wheels of the tractor at least approximately equal to the distance between the axis of said articulated joint and the axis of the wheels of the trailer.

The first of said connection means consist of a plurality of holes formed on the base of the spreading apparatus, to allow connecting the same in different positions, by way of a pin, to an end eyelet of the draw-hook of the tractor.

The second of said connection means comprise, in turn, a square bar connected to said articulated joint and apt to be inserted into the end of the towing drawbar of the trailer, which consists of a square-section tube of corresponding shape, vertical holes and pairs of holes being respectively provided on said bar and on said tube, to connect these last ones in different positions by inserting a pin into one of said holes and pairs of holes.

Furthermore, to the articulated joint with vertical axis there are preferably associated an articulated joint with horizontal axis and a rotating joint, the axis of which coincides with the longitudinal axis of the towing drawbar of the trailer.

The invention will now be described in further detail, with reference to a preferred embodiment thereof, illustrated on the accompanying drawings, in which.

Figure 5:
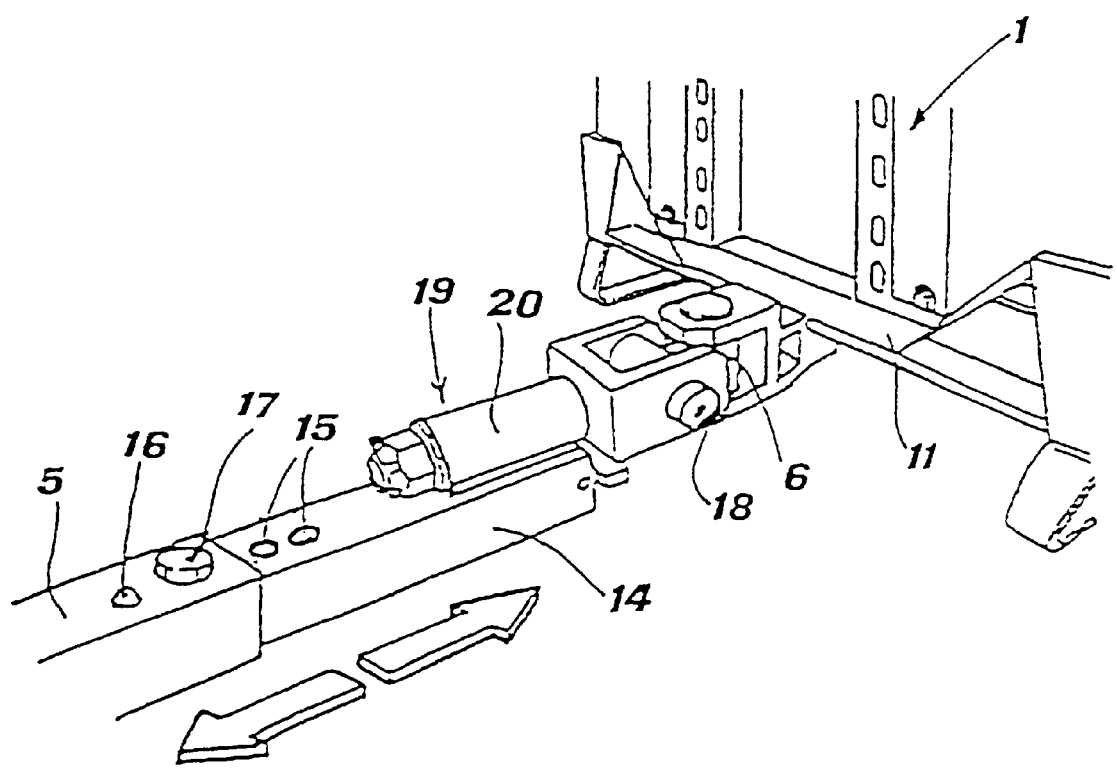
Figure 6A:
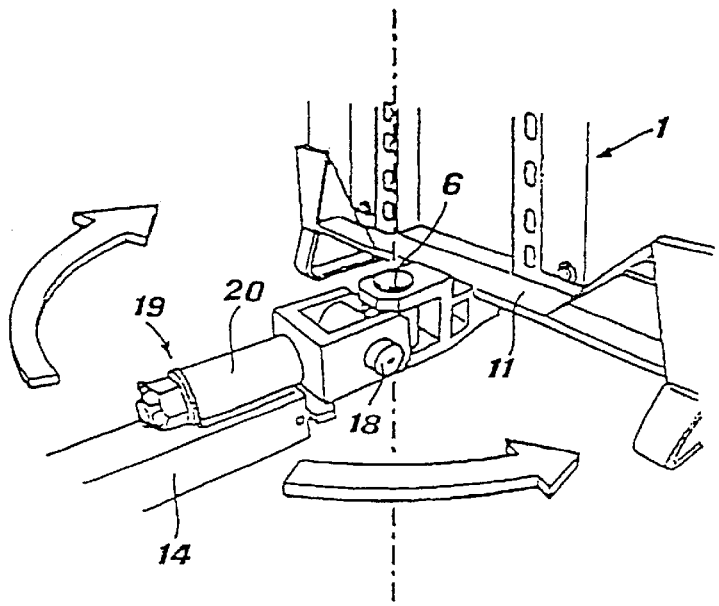
Figure 6B:
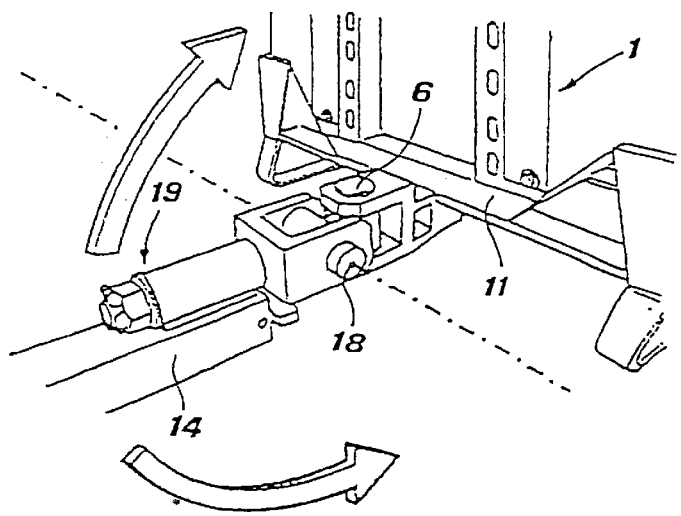
Figure 6C:
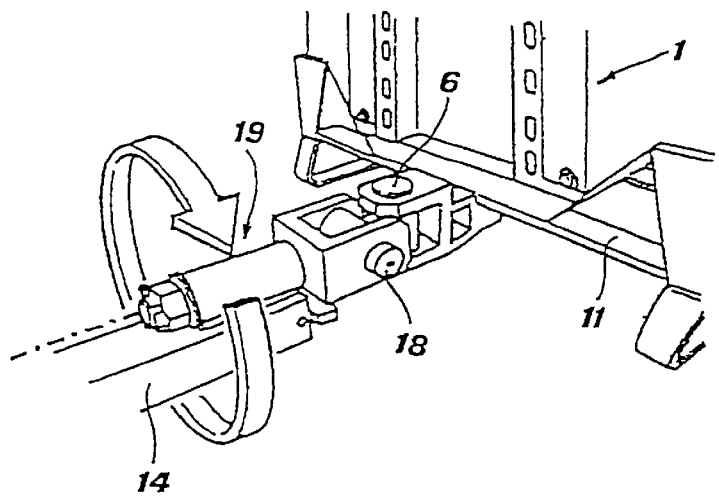

FIG. 5 shows the adjustable connection means between the trailer carrying the tank and the spreading apparatus, according to the present invention, and also illustrates the joint with horizontal axis and the rotating joint, associated to the joint with vertical axis of the atomizer; and FIGS. 6a to 6c illustrate the various freedoms of movement of the trailer in respect of the tractor, in the trailer-mounted atomizer according to the present invention.

Figure 1:
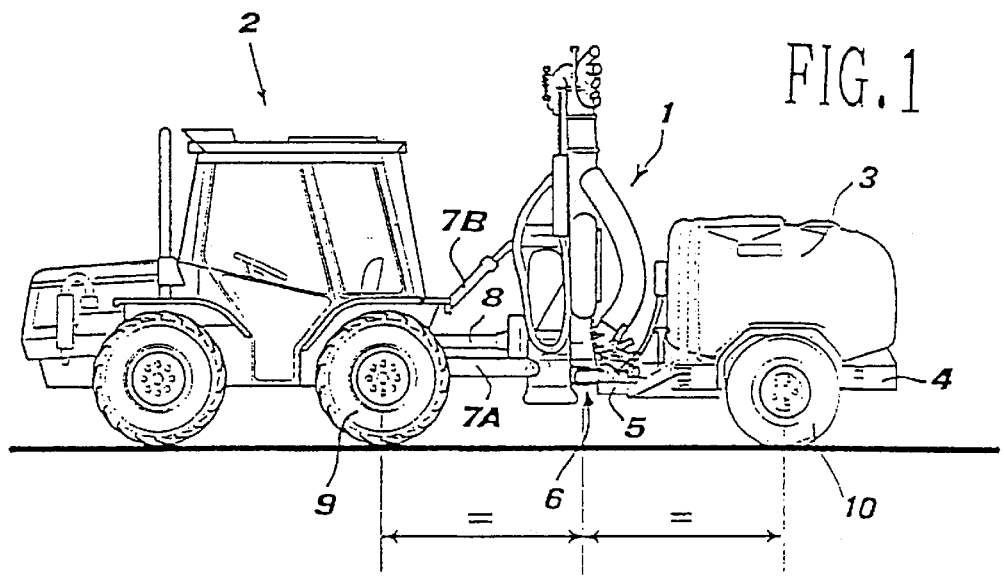
FIG. 1 is a lateral view of the trailer-mounted atomizer according to the present invention, hitched to a tractor drawing the same.

With reference to the accompanying drawings, FIG. 1 illustrates a trailer-mounted atomizer according to the present invention, in its ensemble, comprising a spreading apparatus 1 hitched to a tractor 2. The apparatus 1 is fed from a tank 3 fixedly positioned on a trailer 4 having a towing drawbar 5 which comprises, close to its free end, an articulated joint 6 with vertical axis.

According to the invention, the spreading apparatus 1 is removably fixed to the tractor 2 by being suspended to the draw-hook 7A of said tractor 2, onto which it is also held by jack means 7B. A cardan shaft 8 transmits the motion from the tractor 2 to the atomizer and, being interposed between the tractor 2 and the spreading apparatus 1 (which is hitched to the tractor), it always keeps in a substantially horizontal position.

FIG. 1 also clearly shows how the distance between the axis of said articulated joint 6 and the axis of the rear wheels 9 of the tractor 2 is equal to the distance between the axis of said articulated joint 6 and the axis of the wheels 10 of the trailer 4.

FIG. 2 diagrammatically illustrates how the articulated joint 6—whose axis is substantially vertical and thus, as a rule, substantially perpendicular to the ground—allows the trailer 4 (of which FIG. 2 shows only the wheels 10 and the tank 3 fixedly positioned thereon) to perform bends of about 90° in respect of the tractor moving forward direction.

Figure 3:
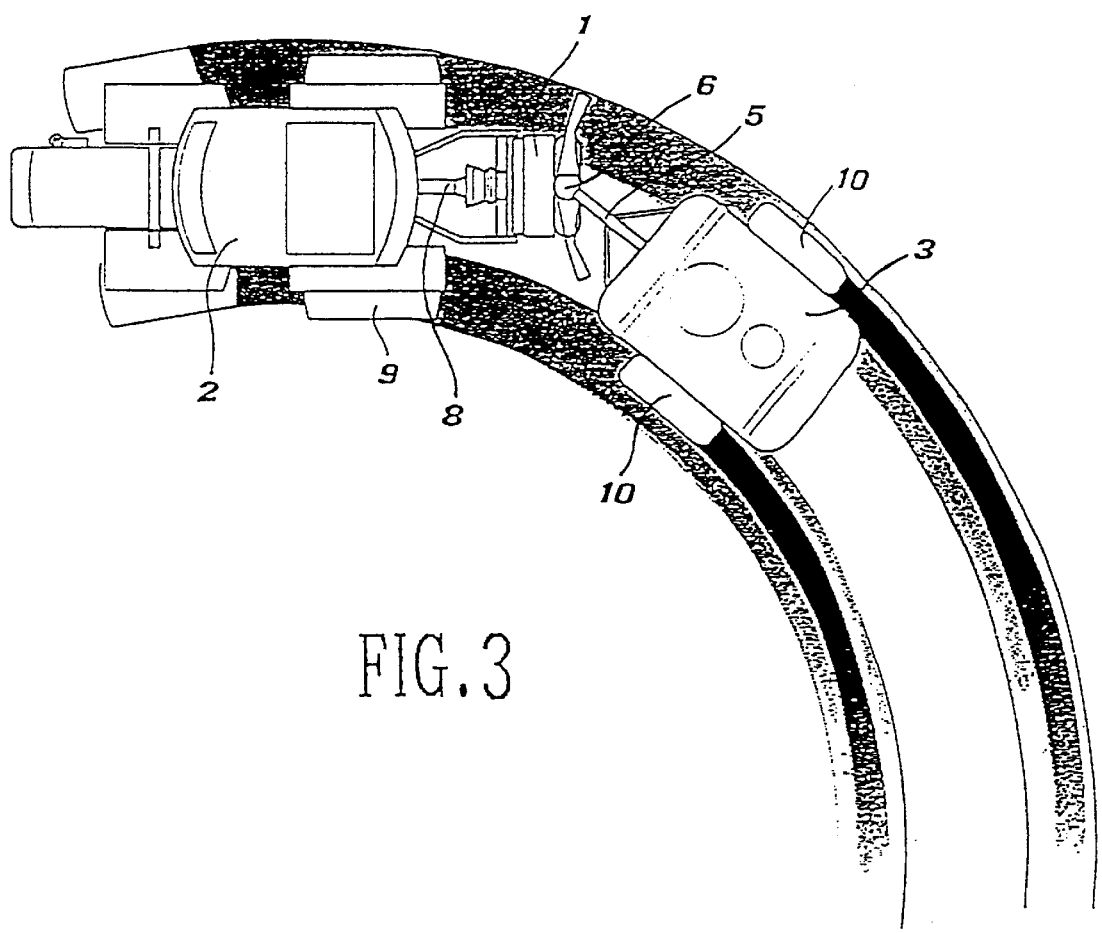
FIG. 3 is a top view showing the same ensemble of FIG. 2 during use, while moving along a curved path.
Figure 2:
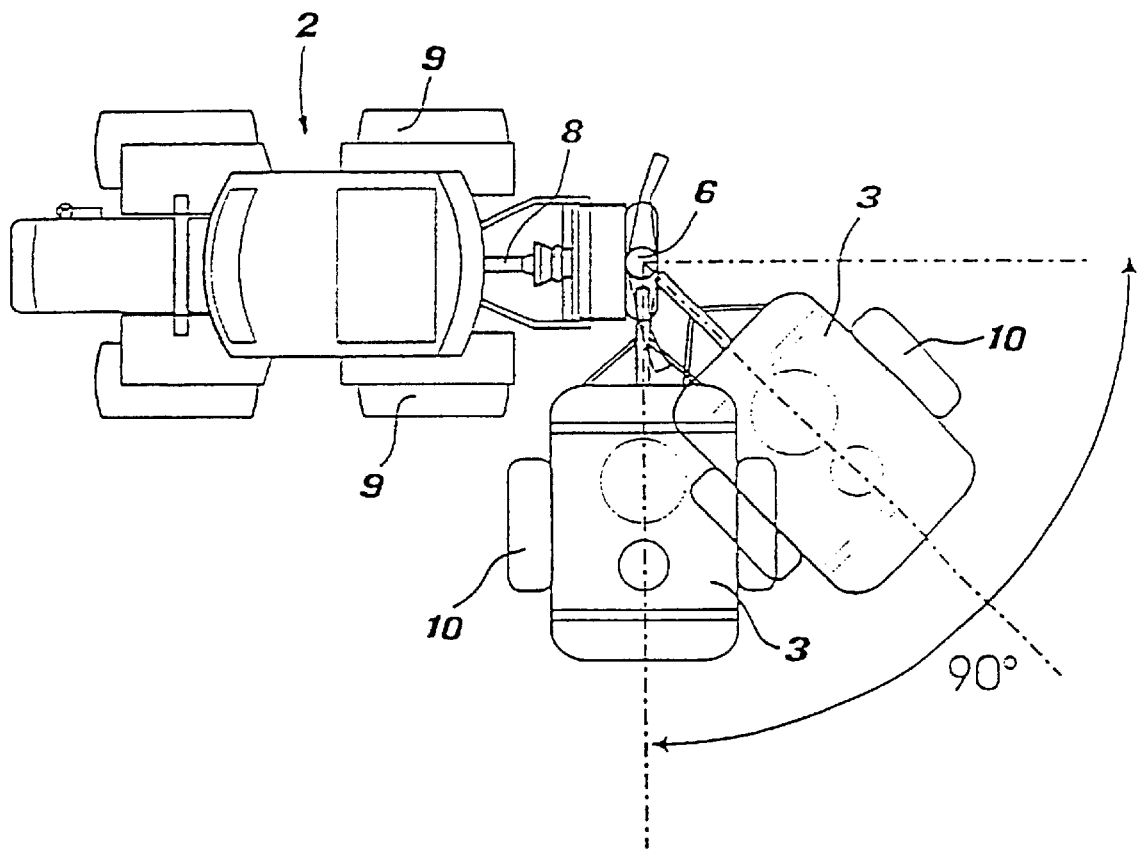
FIG. 2 is a top view of the trailer-mounted atomizer drawn by the tractor, illustrated in FIG. 1, which shows the possibilities of rotation of the trailer in respect of the tractor.

As clearly shown in FIG. 3, the trailer 4 drawn by the tractor 2 is apt to exactly follow the same course followed by said tractor, while spreading the treating substances, since the articulated joint 6 allows the trailer 4 to more or less keep the same bending radius of the tractor, thanks to the substantially equal distances between its axis and the axes of the tractor wheels 9 and, respectively, of the trailer wheels 10. As explained in detail hereinafter, according to the invention said equal distances are obtained by providing adjustable connection means between the spreading apparatus 1 and the tractor 2 and, respectively, between the trailer 4 and the spreading apparatus 1.

Figure 4:
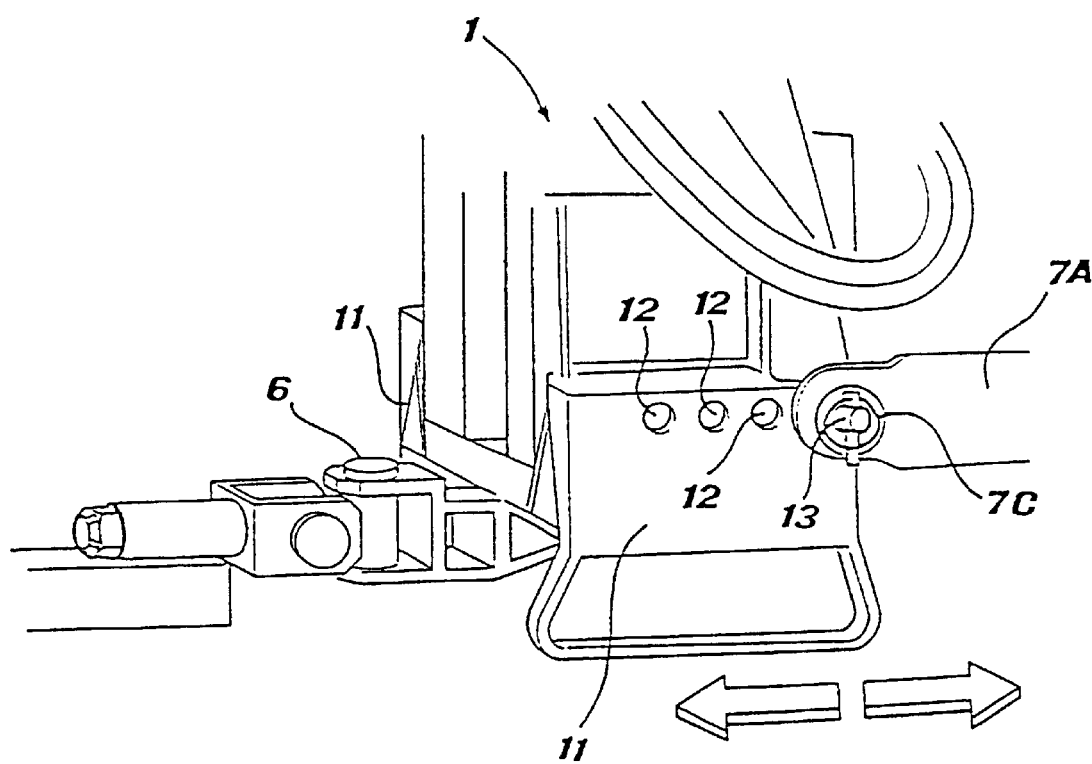
FIG. 4 shows the adjustable connection means between the spreading apparatus and the tractor, according to the present invention.

FIG. 4 illustrates in detail the connection means between the spreading apparatus 1 and the tractor 2 (not shown on the drawing). Said means ensure an accurate adjustment of the distance between the axis of the vertical articulated joint 6, mounted on the base 11 of the spreading apparatus 1, and the axis of the rear wheels 9 of the tractor 2. Such means consist of a plurality of holes 12 formed on said base 11 to allow engaging in different positions, by way of a pin 13, the apparatus 1 into the end eyelet 7C of the draw-hook 7A of said tractor 2, and thereby vary the distance between the axis of the joint 6 and the axis of the wheels 9. Besides being suspended with its base 11 to the draw-hook 7A of the tractor 2, the apparatus 1 is quite firmly held onto said tractor by at least one jack 78 (FIG. 1).

FIG. 5 illustrates in detail the connection means between the spreading apparatus 1 and the trailer 4 (not shown on the drawing). Said means ensure an accurate adjustment of the distance between the axis of the vertical articulated joint 6, mounted on the base 11 of the spreading apparatus 1, and the axis of the wheels 10 of the trailer 4. Such means consist of a short square bar 14 connected to the articulated joint 6 of the base 11 of the apparatus 1 and provided with a plurality of vertical holes 15. Said bar 14 is apt to be inserted into the end of the towing drawbar 5, which consists of a square-section tube of corresponding shape and comprises one or more pairs of vertical holes 16, into which said bar 14 is engaged by way of a pin 17; the distance between the axis of the wheels 10 of the trailer 4 and the axis of the articulated joint 6 can thus be adjusted by engaging the vertical holes 15 and 16, by way of said pin 17, in the different required positions.

It is hence evident that, with the aforedescribed adjustable connection means according to the present invention, it is very simple and practical to obtain the double adjustment between the atomizer and the tractor having to draw the same, since no precautions are required other than a careful choice of the holes 15 and 16 having to be engaged by way of the pin 17, namely, an accurate study of the distances—which should be practically equal—between the axis of the articulated joint 6 and the axes of the wheels 9 and respectively 10.

As also illustrated in FIG. 5, according to the invention a second articulated joint 18 with horizontal axis is moreover associated to the articulated joint 6 with vertical axis mounted on the base 11 of the spreading apparatus 1; said joint 18 allows the trailer 4 to perform oscillations also about a substantially horizontal axis, and thus substantially parallel to the axis of the wheels 10 of the trailer 4 and of the wheels 9 of the tractor 2. Furthermore, according to the invention, it is also possible to connect the ensemble of said two joints 6 and 18 to the square bar 14, connecting the trailer 4 to the towing drawbar 5, by means of a third rotating joint 19 consisting of a cylinder 20 welded to said bar 14, into which rotates a pin connected to the joint 18. This third joint 1 9 allows to perform rotations about an axis substantially coinciding with the longitudinal axis of the towing drawbar 5 of the trailer 4.

FIGS. 6a to 6c clearly illustrate the various freedoms of movement of the trailer 4 carrying the tank 3 of the atomizer according to the invention, while the apparatus 1 of the atomizer, spreading the treating substances, remains substantially fixed to the drawing tractor 2. Such freedoms of movement allow to drastically limit the unwanted stresses—determined by the difficulties of the set courses and by the roughness and unevenness of the ground—on the whole atomizer and on its components, particularly those of connection to the tractor 2. On the other hand, and according to the main object of the invention, the aforedescribed and illustrated atomizer is apt—always thanks to said freedoms of movement—to exactly follow (namely "reproduce") the path of the tractor (as shown in FIG. 3) also on the mixed courses forming particularly sharp bends, thereby increasing the roadholding and reducing the risks of turnover compared to those of known technique, and is above all apt to ensure a very uniform spreading of the treating substance over the cultivations, according to the wishes of the operator.

For what concerns the undesired stresses which, in known technique, hamper the motion transmission from the tractor to the atomizer, they are totally eliminated since, according to the invention, the cardan shaft 8 constantly keeps its substantially horizontal position—whatever the position of the trailer 4 in respect of the tractor 2—due to the fact that said shaft is interposed between the actual tractor and the spreading apparatus 1 which is fixedly hitched thereto.

It should finally be taken into account that the solution according to the invention allows to easily and rapidly connect the atomizer to various types of tractors and draw-hooks, always keeping substantially equal the distances between the axis of the articulated joint 6 and the axes of the wheels 9 of the tractor 2 and, respectively, of the wheels 10 of the trailer 4. It can thus no doubt be defined as being of universal use.

A particularly preferred embodiment of the invention has been described heretofore; it can however be easily understood that any modifications and variants may be introduced therein, all within reach of a person skilled in the art, without thereby departing from the scope of the present invention.

What is claimed is:

1. Trailer-mounted atomizer preset to be towed with a tractor, comprising:
    a trailer (4);
    a tank (3) fixed directly onto the trailer;
    a spreading apparatus (1) fed from the tank (3) and removably fixed to the tractor (2); and
    a towing drawbar (5) attached to the trailer and articulated to the tractor (2) by the spreading apparatus (1),
    wherein the towing drawbar (5) of the trailer (4) is connected to a base (11) of the spreading apparatus (1) by an articulated joint (6) with a vertical axis, and
    the spreading apparatus (1) is removably fixed to the tractor (2) by being suspended to a draw-hook (7A) of said tractor, onto which tractor the spreading apparatus is also held by jack means (7B).

2. Atomizer as in claim 1, wherein a motion is transmitted from the tractor (2) to the spreading apparatus by a cardan shaft (8), the cardan shaft attached to the tractor (2) and the spreading apparatus (1).

3. Atomizer as in claim 1, wherein,
    adjustable connection means are provided between the spreading apparatus (1) and the tractor (2) and, respectively, between the trailer (4) and the spreading apparatus (1), to make a distance between the vertical axis of said articulated joint (6) and an axis of the rear wheels (9) of the tractor (2) at least approximately equal to a distance between the vertical axis of said articulated joint (6) and an axis of wheels (10) of the trailer (4).

4. Atomizer as in claim 3, wherein the adjustable connection means includes a first connection means comprising a plurality of holes (12) formed on the base (11) of the spreading apparatus (1) to allow connecting the spreading machine in different positions, by way of a pin (13), to an end eyelet (7C) of the draw-hook (7A) of the tractor (2).

5. Atomizer as in claim 4, wherein,
a second connection means comprises a square bar (14) connected to the articulated joint (6) and apt to be inserted into an end of the trailer towing drawbar (5), which square bar comprises a square-section tube of corresponding shape to the drawbar,
vertical holes (15) and pairs of holes (16) are respectively provided on said bar and on said tube, to connect the bar and tube in different positions by inserting a pin (17) into one of said holes (15) and pairs of holes (16).

6. Atomizer as in claim 1, wherein, to the articulated joint (6) with vertical axis there is associated an articulated joint (18) with horizontal axis.

7. Atomizer as in claim 6, wherein, to the articulated joints with vertical axis (6) and with horizontal axis (18) there is associated a rotating joint (19), an axis of which rotating joint coincides with a longitudinal axis of the towing drawbar (5) of the trailer (4).

8. Trailer-mounted atomizer preset to be towed with a tractor, comprising:
a trailer (4) connectable to a draw-hook (7A) of the tractor;
a tank fixed directly onto the trailer;
a spreading apparatus (1) fed from the tank (3) and removably fixed to the tractor (2) by being suspended to the draw-hook (7A) and held by jack means (7B); and
a towing drawbar (5) attached to the trailer and to a base (11) of the spreading apparatus by an articulated joint (6) with a vertical axis, the towing drawbar being articulated to the tractor (2) by the spreading apparatus (1).

9. Atomizer as in claim 8, wherein a motion is transmitted from the tractor (2) to the atomizer by a cardan shaft (8), the cardan shaft interposed between the tractor (2) and the spreading apparatus (1).

10. Atomizer as in claim 8, wherein,
adjustable connection means are provided between the spreading apparatus (1) and the tractor (2) and, respectively, between the trailer (4) and the spreading apparatus (1), to make a distance between the vertical axis of said articulated joint (6) and an axis of the rear wheels (9) of the tractor (2) at least approximately equal to a distance between the vertical axis of said articulated joint (6) and an axis of wheels (10) of the trailer (4).

11. Atomizer as in claim 10, wherein the adjustable connection means includes a first connection means comprising a plurality of holes (12) formed on the base (11) of the spreading apparatus (1) to allow connecting the spreading machine in different positions, by way of a pin (13), to an end eyelet (7C) of the draw-hook (7A) of the tractor (2).

12. Atomizer as in claim 11, wherein,
a second connection means comprises a square bar (14) connected to the articulated joint (6) and apt to be inserted into an end of the trailer towing drawbar (5), which square bar comprises a square-section tube of corresponding shape to the drawbar,
vertical holes (15) and pairs of holes (16) are respectively provided on said bar and on said tube, to connect the bar and tube in different positions by inserting a pin (17) into one of said holes (15) and pairs of holes (16).

13. Atomizer as in claim 8, wherein, to the articulated joint (6) with vertical axis there is associated an articulated joint (18) with horizontal axis.

14. Atomizer as in claim 13, wherein, to the articulated joints with vertical axis (6) and with horizontal axis (18) there is associated a rotating joint (19), an axis of which rotating joint coincides with a longitudinal axis of the towing drawbar (5) of the trailer (4).

15. Trailer-mounted atomizer preset to be towed with a tractor, comprising:
a trailer (4) connectable to a draw-hook (7A) of the tractor;
a tank fixed directly onto the trailer;
a spreading apparatus (1) fed from the tank (3) and removably fixed to the tractor (2); and
a towing drawbar (5) attached to the trailer and to a base (11) of the spreading apparatus by an articulated joint (6) with a vertical axis, the towing drawbar being articulated to the tractor (2) by the spreading apparatus (1).

16. Atomizer as in claim 15, wherein the spreading apparatus is removably fixed to the tractor (2) by being suspended to the draw-hook (7A) and held by jack means (7B).

17. Atomizer as in claim 16, wherein a motion is transmitted from the tractor (2) to the atomizer by a cardan shaft (8), the cardan shaft interposed between the tractor (2) and the spreading apparatus (1).

18. Atomizer as in claim 15, wherein,
adjustable connection means are provided between the spreading apparatus (1) and the tractor (2) and, respectively, between the trailer (4) and the spreading apparatus (1), to make a distance between the vertical axis of said articulated joint (6) and an axis of the rear wheels (9) of the tractor (2) at least approximately equal to a distance between the vertical axis of said articulated joint (6) and an axis of wheels (10) of the trailer (4),
the adjustable connection means includes a first connection means comprising a plurality of holes (12) formed on the base (11) of the spreading apparatus (1) to allow connecting the spreading machine in different positions, by way of a pin (13), to an end eyelet (7C) of the draw-hook (7A) of the tractor (2), and
a second connection means comprises a square bar (14) connected to the articulated joint (6) and apt to be inserted into an end of the trailer towing drawbar (5), which square bar comprises a square-section tube of corresponding shape to the drawbar,
vertical holes (15) and pairs of holes (16) are respectively provided on said bar and on said tube, to connect the bar and tube in different positions by inserting a pin (17) into one of said holes (15) and pairs of holes (16).

19. Atomizer as in claim 15, wherein,
an articulated joint (18) with horizontal axis is associated with the articulated joint (6) with vertical axis,
a rotating joint (19) is associated with the articulated joints with vertical axis (6) and with horizontal axis (18), and
an axis of the rotating joint coincides with a longitudinal axis of the towing drawbar (5).

* * * * *